(12) United States Patent
Broda et al.

(10) Patent No.: US 8,341,462 B2
(45) Date of Patent: Dec. 25, 2012

(54) SYSTEM AND METHOD FOR PROVISIONING AND RUNNING A CROSS-CLOUD TEST GRID

(75) Inventors: Tal Broda, Sunnyvale, CA (US); Matt Solnit, San Jose, CA (US); Kenneth C. Gardner, Palo Alto, CA (US); Craig Powers, San Francisco, CA (US); Michael Hemmert, Scotts Valley, CA (US); Charles Vazac, San Francisco, CA (US); Kendall Cosby, Aurora, CA (US)

(73) Assignee: SOASTA, Inc., Mountain View, CA (US)

( * ) Notice: Subject to any disclaimer, the term of this patent is extended or adjusted under 35 U.S.C. 154(b) by 355 days.

(21) Appl. No.: 12/804,317

(22) Filed: Jul. 19, 2010

(65) Prior Publication Data
US 2012/0017112 A1   Jan. 19, 2012

(51) Int. Cl.
*G06F 11/00* (2006.01)
(52) U.S. Cl. ......... 714/25; 714/4.1; 714/38.1; 714/47.1; 714/3
(58) Field of Classification Search .................. 714/4.1, 714/25
See application file for complete search history.

(56) References Cited

U.S. PATENT DOCUMENTS

| | | | |
|---|---|---|---|
| 5,724,525 A | 3/1998 | Beyers et al. | |
| 5,945,986 A | 8/1999 | Bargar et al. | |
| 6,025,853 A | 2/2000 | Baldwin | |
| 6,092,043 A | 7/2000 | Squires et al. | |
| 6,134,582 A | 10/2000 | Kennedy | |
| 6,542,163 B2 | 4/2003 | Gorbet et al. | |
| 6,817,010 B2 | 11/2004 | Aizenbud-Reshef et al. | |
| 6,959,013 B1 | 10/2005 | Muller et al. | |
| 7,334,162 B1 | 2/2008 | Vakrat et al. | |
| 7,376,902 B2 | 5/2008 | Lueckhoff | |
| 7,464,121 B2 | 12/2008 | Barcia et al. | |
| 7,478,035 B1 | 1/2009 | Wrench et al. | |
| 7,587,638 B2 | 9/2009 | Shah et al. | |
| 7,594,238 B2 | 9/2009 | Takahashi | |
| 7,607,169 B1 | 10/2009 | Njemanze et al. | |
| 7,630,862 B2 | 12/2009 | Glas et al. | |
| 7,685,234 B2 | 3/2010 | Gottfried | |
| 7,689,455 B2 | 3/2010 | Fligler et al. | |
| 7,693,947 B2 | 4/2010 | Judge et al. | |
| 7,757,175 B2 | 7/2010 | Miller | |
| 7,844,036 B2 | 11/2010 | Gardner et al. | |

(Continued)

OTHER PUBLICATIONS

Chester et al., Mastering Excel 97, 1994, Sybex, 4th Ed., pp. 1016, 136-137, 430, 911, 957-958.

*Primary Examiner* — Chae Ko
(74) *Attorney, Agent, or Firm* — The Law Offices Bradley J. Bereznak (57) ABSTRACT

An automated method for provisioning a grid used to run a load test on a target website includes sending one or more requests in a multi-threaded manner to at least one cloud provider, the one or more requests for an allocation of N load server instances and M result server instances which comprise the grid. Requests received back from the cloud provider are also handled in a multi-threaded manner; any errors occurring during the allocation being corrected automatically. The N load server instances and the M result server instances are then verified to be operational and correctly running software deployed to provide defined test services. Errors identified during the verification are automatically corrected either by attempting to restart a failed instance or allocating a different instance.

23 Claims, 11 Drawing Sheets

U.S. PATENT DOCUMENTS

| | | | |
|---|---|---|---|
| 8,166,458 B2 * | 4/2012 | Li et al. | 717/124 |
| 2004/0039550 A1 * | 2/2004 | Myers | 702/186 |
| 2004/0059544 A1 * | 3/2004 | Smocha et al. | 702/182 |
| 2004/0205724 A1 | 10/2004 | Mayberry | |
| 2005/0102318 A1 * | 5/2005 | Odhner et al. | 707/102 |
| 2005/0216234 A1 * | 9/2005 | Glas et al. | 702/186 |
| 2005/0278458 A1 * | 12/2005 | Berger et al. | 709/248 |
| 2006/0271700 A1 * | 11/2006 | Kawai et al. | 709/233 |
| 2007/0232237 A1 | 10/2007 | Croak et al. | |
| 2008/0059947 A1 | 3/2008 | Anand et al. | |
| 2008/0066009 A1 | 3/2008 | Gardner et al. | |
| 2009/0271152 A1 * | 10/2009 | Barrett | 702/186 |
| 2010/0057935 A1 * | 3/2010 | Kawai et al. | 709/241 |
| 2010/0115496 A1 * | 5/2010 | Amichai | 717/135 |
| 2010/0250732 A1 * | 9/2010 | Bucknell | 709/224 |
| 2010/0251128 A1 | 9/2010 | Cordasco | |
| 2011/0066892 A1 | 3/2011 | Gardner et al. | |
| 2011/0119370 A1 * | 5/2011 | Huang et al. | 709/224 |
| 2011/0130205 A1 | 6/2011 | Cho et al. | |
| 2011/0282642 A1 | 11/2011 | Kruger et al. | |
| 2012/0017210 A1 * | 1/2012 | Huggins et al. | 718/1 |
| 2012/0101799 A1 * | 4/2012 | Fernandes | 703/21 |

* cited by examiner

SYSTEM AND METHOD FOR PROVISIONING AND RUNNING A CROSS-CLOUD TEST GRID

TECHNICAL FIELD

The present disclosure relates generally to cloud computing; more particularly, to automated systems and methods for functional and/or load testing of websites or features of message-based, intranet, Internet, or browser-based applications.

BACKGROUND

Information technology is now routinely used by many enterprises to receive, process, and provide information via widely accessible electronic communications networks, such as the Internet. Yet most information technology systems will begin to deny service, or fail to process message traffic efficiently, when communications traffic exceeds a processing capacity of the system. Such failures in communication can significantly impair the operations of an enterprise in many ways. Slower website performance is also known to cause users/visitors to leave the website sooner. Another consequence of poor performance is that the website may be downgraded in search engine results rankings.

In recent years, enterprises and developers have sought an easy and affordable way to use cloud computing as a way to load and performance test their web-based applications. Cloud computing gets its name from the fact that the machine, storage, and application resources exist on a "cloud" of servers. In cloud computing shared resources, software and information are provided on-demand, like a public utility, via the Internet. Cloud computing is closely related to grid computing, which refers to the concept of interconnecting networked computers such that processing power, memory and data storage are all community resources that authorized users can utilize for specific tasks.

By way of example, a company that provides online tax preparation services to customers who wish to file their tax returns electronically may want to test the reliability of their website to uncover potential reliability and performance problems well before April $14^{th}$ and $15^{th}$ when traffic volumes spike as customers rush to meet the filing deadline. Replicating anticipated user load for a business website traditionally requires hours and hours of error prone manual allocation and deployment of machine instances comprising the grid utilized for the test. In addition, the user often is required to deal with different tools that each cloud provider provides to allocate the servers and then deploy the user's proprietary software thereon. Once allocated, the user also needs to recover from the percentage of servers which are non-operational upon delivery, as well as those that do not respond even after the software product has been deployed on them. All of this tedious, time-consuming, and error-prone work has to be completed before each test can be run.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

DETAILED DESCRIPTION

In the following description specific details are set forth, such as server types, cloud providers, structural features, process steps, etc., in order to provide a thorough understanding of the subject matter disclosed herein. However, persons having ordinary skill in the relevant arts will appreciate that these specific details may not be needed to practice the present invention. It should also be understood that the elements in the FIG.s are representational, and are not drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present application, the term "cloud" broadly refers to a collection of machine instances, storage and/or network devices that work together in concert. A "public cloud" refers to a cloud that is publically available, i.e., provided by a cloud provider that a user may access via the Internet in order to allocate cloud resources for the purpose of utilizing or deploying software programs, and also for running or executing those programs thereon. Some public clouds deliver cloud infrastructure services or Infrastructure as a Service (IaaS). By way of example, Amazon Elastic Compute Cloud (also known as "EC2™") is a web service that allows users to rent computers on which to run their own computer applications, thereby allowing scalable deployment of applications through which a user can create a virtual machine (commonly known as an "instance") containing any software desired. The term "elastic" refers to the fact that user can create, launch, and terminate server instances as needed, paying by the hour for active servers.

Cloud platform services or "Platform as a Service (PaaS)" deliver a computing platform and/or solution stack as a service. An example PaaS cloud provider is the Google App Engine, which lets anyone build applications on Google's scalable infrastructure. Another leading software platform in the cloud provider is Microsoft Azure™, an application platform in the cloud that allows applications to be hosted and run at Microsoft datacenters.

A "private cloud" is a cloud that is not generally available to the public, and which is typically located behind a firewall of a business. Thus, a private cloud is only available as a platform for users of that business who are behind the firewall.

The term "server" broadly refers to any combination of hardware or software embodied in a computer (i.e., a machine "instance") designed to provide services to client devices or processes. A server therefore can refer to a computer that runs a server operating system and is provided to the user as virtualized or non-virtualized server; it can also refer to any software or dedicated hardware capable of providing computing services.

In the context of the present disclosure, "load" servers (also referred to as "Maestro" or "test" servers) are servers deployed and utilized primarily to generate a test load on a target website. That is, load servers play the test composition, generating a load on a target (customer) website and web applications. Load servers also function to report back results of the load test and statistics in real-time. "Analytic" or "result" servers are deployed and utilized primarily to collect the real-time test results from the load servers, aggregate those results, and store them in a database.

The term "real time" refers to a level of computer responsiveness that a user senses as sufficiently immediate or that enables the computer to keep up with some external process (for example, to present visualizations of load test results as it constantly changes). Thus, real-time is a mode of computer operation in which the computer collects data, analyzes or computes with the data, reports (e.g., visually displays) and/ or stores the results nearly simultaneously, i.e., within milliseconds or microseconds.

In one embodiment, a computer-enabled method or computer program is provided that automatically allocates and deploys N servers on M clouds (where N and M are positive integers) to create a grid comprising a collection of interconnected load servers and result servers that may then be used to run a load test on a target website or web applications. The computer program disclosed herein automatically determines the global, cross-cloud, resources needed to execute a test by examining the test plan or script (also referred to as a test composition).

Furthermore, the computer program automatically allocates those server resources required for the test across multiple different cloud providers; verifies that the allocated servers are operational; and that the allocated servers are running proprietary load testing software or computer program product correctly. In a specific embodiment, the computer program or product also monitors the allocated servers, replacing non-operational servers (when allocated, and during execution of the test) and displays results from multiple globally distributed clouds in a real-time streaming dashboard which requires no user initiated refresh. Thus, instead of spending hours on the tedious task of manually getting a test environment up and running, utilizing the architecture and automated methods described herein the same result may typically be achieved in approximately ten minutes or less, without any human intervention required.

Figure 1:
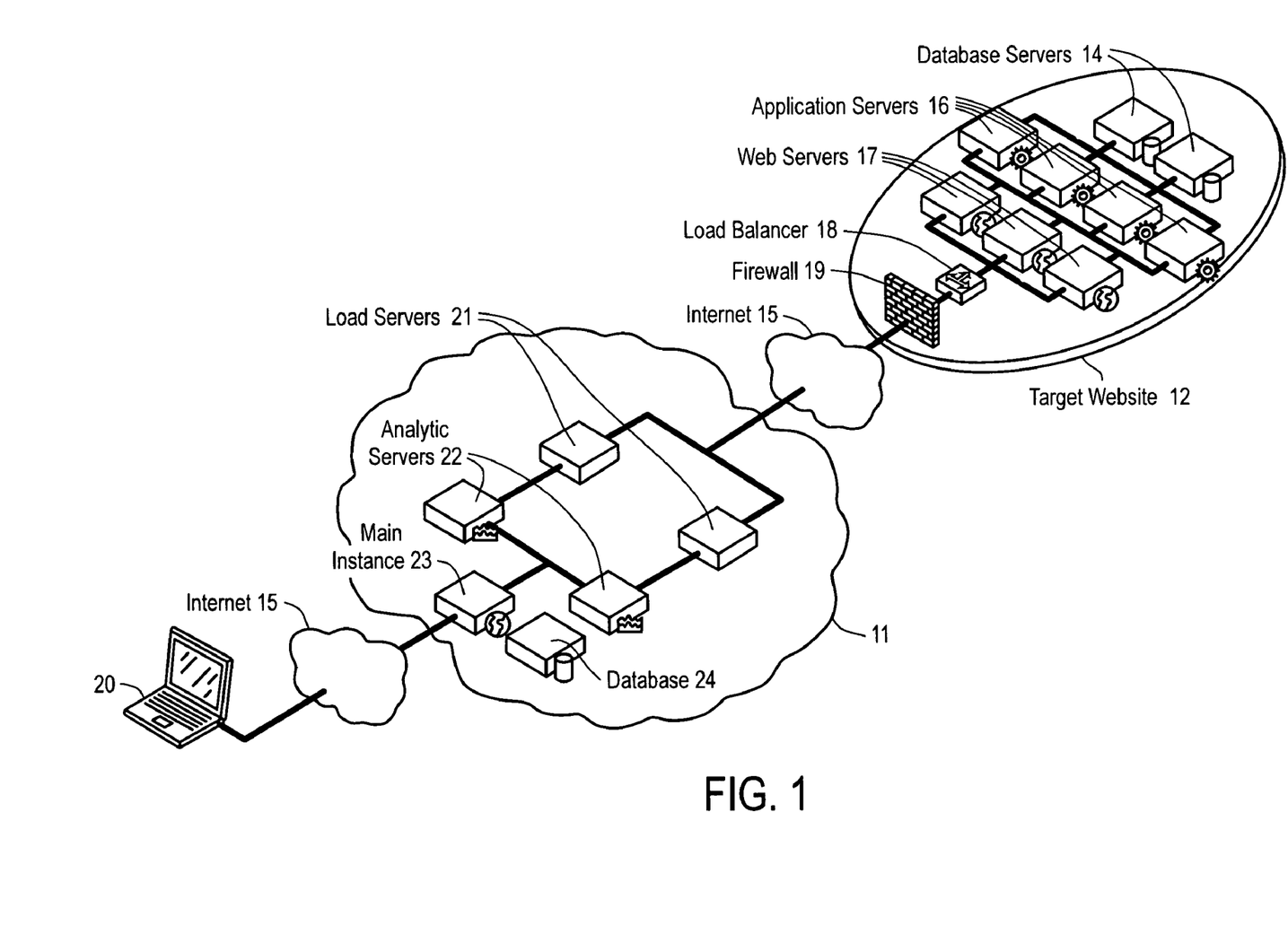
FIG. 1 illustrates an example high level architectural diagram of one stage of a CloudTest® provisioning process.

FIG. 1 illustrates an example high level architectural diagram of one stage of a CloudTest® provisioning program or process, which is the name given to the application program or grid wizard program described herein. As shown, a target website 12 includes a plurality of web servers 17 coupled to Internet cloud 15 through a load balancer 18 and a firewall 19. Web servers 17 are interconnected with a plurality of application servers 16 and a plurality of database servers 14.

Target website 12 is shown connected to a public cloud 11 via Internet cloud 15a. Public cloud 11 includes a main instance 23 coupled to a database 24. Database 24 may be used to store test results, store metadata indicative of the test definition, and to store monitoring data (e.g., CPU metrics) generated during the load test. Main instance 23 is also shown coupled to a pair of analytic servers 22 and a pair of load servers 21 within cloud 11, consistent with a snapshot view of the start of a process of deploying a test grid. It is appreciated that cloud 11 may comprise multiple clouds associated with multiple different cloud providers. In the example shown, main instance 23 is a virtual machine deployed on a server provided in cloud 11 that communicates with a browser application. In one embodiment, main instance 23 may include a results service (designated as a "reader" results service, as opposed to all of the other remote, "writer" results services) which reads data from database 24 and serves it to a web application, which in turn formats the data and serves it to an analytic dashboard in the browser. In operation, main instance 23 executes the coded sequence of computer executed steps that allocates the server resources required for the test across one or multiple different cloud providers. The same application that allocates/verifies server resources may also verify that the allocated servers are operational to conduct the website load test.

Connected to the front-end of cloud 11 through Internet cloud 15 is a laptop computer 20 associated with a user who may orchestrate deployment of the test of target website 12. It is appreciated that in other implementations, computer 20 may comprise a desktop computer, workstation, or other computing device that provides a user interface that allows a user to create and execute the test composition, define the parameters of the grid, initiate the load test, as well as analyze/review results of the test in real-time. The user interface may be web-based so it can be accessed from any computer having web-browser capabilities from any location in the world, without installation of specialized software. In other words, the computer 20 includes an external interface that connects with another computing device via Internet cloud 15.

Persons of skill in the art will understand that the software which implements main instance 23 may also be downloaded to the user's laptop computer 20 or implemented on a separate hardware appliance unit located either at the user's premises (e.g., behind the firewall) or anywhere in clouds 15 or 11. It is further appreciated that laptop 20 is representative of a wide variety of computer devices, such as workstations, personal computers, distributed computer systems, etc., that may be utilized by the user to launch the method for provisioning/ running the cross-CloudTest grid, analyzing streaming real-time results, as well as monitoring the performance of the actual load test. In other words, a user of computer 20 may input one or more commands using a graphical user interface that generates output to main instance 23 via an external interface that connects with main instance 23, the output causing main instance 23 to perform the functions described herein.

Continuing with the example of FIG. 1, the application program running on main instance 23 operates to create a graphical user interface (GUI) that allows a user of laptop 20 to remotely interact with the application, view/monitor the test results in real-time, and modify parameters/test conditions dynamically during the actual test. (For purposes of the present disclosure, the grid wizard is considered synonymous with the application program or system program that performs the method and operations described herein.) In one embodiment, main instance 23 may include an embedded load server for running a relatively small load test that does not require the deployment of other load servers, and an embedded results (i.e., analytic) server for collecting/aggregating the real-time test results. In another embodiment, the main instance and the database provide a basic CloudTest environment that can be used to launch/establish one or more grids, with more or more cloud providers being utilized to provision each grid.

The overall testing process begins with the user creating a sophisticated test plan or composition via a GUI of either the same application program running on main instance 23 or a GUI associated with another web browser application. The GUI may be utilized that generate complex parallel message streams for website testing. In one example, the test plan may be created in the form of a visual message composition (analogous to a music composition) for testing and demonstrating web services, such as that described in U.S. patent application Ser. No. 11/503,580, filed Aug. 14, 2006, which application is herein incorporated by reference.

The process of deploying the test grid for a large-scale test may start with the user of laptop 20 indicating to main instance 23 the number of virtual users wanted on each track of the test composition. For example, the user of the system may wish test the target website with a load equal to 1000 users on each track of a test composition. The user may indicate the number of virtual users through an input entered on a browser page of the GUI (as described below), or, alternatively, invoke a grid wizard that automatically makes an intelligent allocation of the proper amount of resources needed to conduct the test, based on examining the composition that this grid will be running. By way of example, the system may determine that a single load server should be allocated to accommodate every 1000 virtual users.

Similarly, the system (via a grid wizard) may determine a proper allocation of result servers needed to accommodate the number of load servers specified. In one embodiment, users can specify how many load servers and how many result servers they want in each cloud and region. Alternatively, users may employ the grid wizard to specify all parameters. That is, users can simply specify a defined test composition, and the grid wizard automatically analyzes the composition and determines how many servers they need in each cloud and region. It is appreciated that the determination of the number of load servers and result servers is typically made based on considerations that ensure each virtual user has a satisfactory amount of bandwidth, CPU & memory resources, etc., such that it correctly simulates or behaves as a real-world browser.

Once the test has been defined and the parameters set (e.g., number of servers, server locations, etc.) via the grid wizard, upon user input, the user main instance 23 starts the process of actually deploying and allocating the specified resources by interacting with an application programming interface (API) of one or more cloud providers. By way of example, a user may click on a "Deploy Instances" button provided in a page of the CloudTest program GUI; in response, the system software contacts all of the different cloud APIs it needs and starts to allocate the required servers.

For example, if 1000 servers are to be allocated in EC2 there may be 40 simultaneous requests issued, each request being for 25 servers. If another 200 servers need to be allocated in Microsoft Azure in two different geographically-located data centers, two simultaneous requests may be issued, each for 100 servers in each data center (due to the fact that Azure does not support allocating smaller groups into one single deployment). In other words, the user may simply click on an icon button of a GUI to initiate the deployment/allocation of resources (e.g., machine instances) needed to execute the test composition, with the requests necessary to achieve that allocation being issued/handled in an automated manner, i.e., without user intervention.

FIG. 1 show the beginning of this process, wherein a first pair of load servers 21 and analytic servers 22 (also referred to as result servers or results services) have already been allocated and deployed on the grid.

Figure 2:
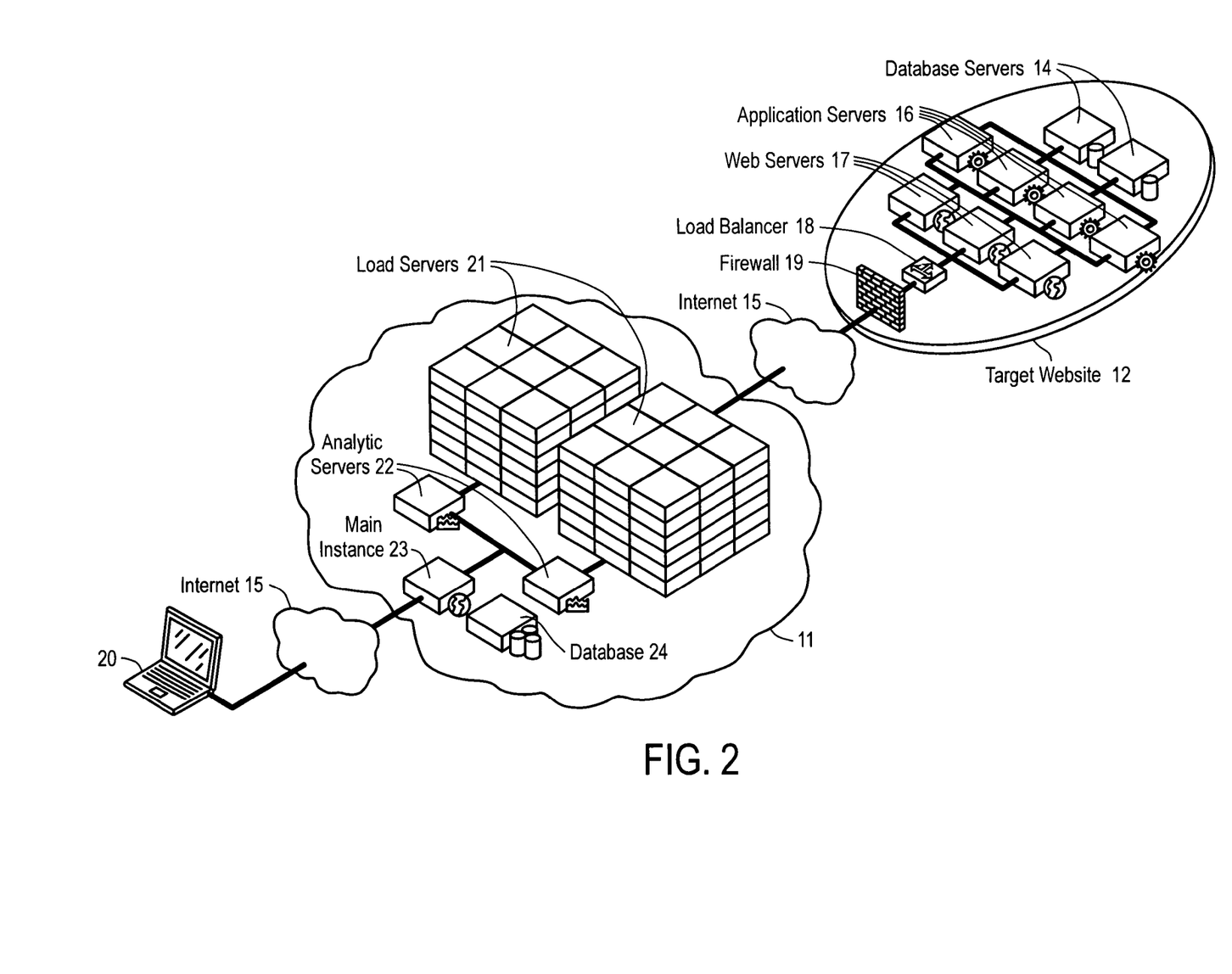
FIG. 2 illustrates an example high level architectural diagram of another stage of a CloudTest® provisioning process after the cross-cloud grid has been fully allocated and checked.

FIG. 2 illustrates an example high level architectural diagram of a later stage of a CloudTest test grid provisioning process, which may be after the cross-cloud grid has been fully allocated and checked. For reasons of clarity, an array of just fifty-four interconnected load servers 21 are shown allocated per each result server 22 in the example of FIG. 2. It is appreciated, however, that the system and method described herein is highly scalable and capable of deploying/allocating a massive amount of resources including hundreds or thousands of load servers as well as a corresponding portion or ratio of result servers, depending on the parameters specified by either the user or system prior to deployment of the grid. In one embodiment, a typical ratio of analytic (result) servers to load (maestro) servers is 1:50. As discussed previously, a grid—whether cross-cloud or single cloud—is a collection of load servers 21 and result servers 22, all of which (or a subset of) can be used to run a load test in concert.

Figure 6:
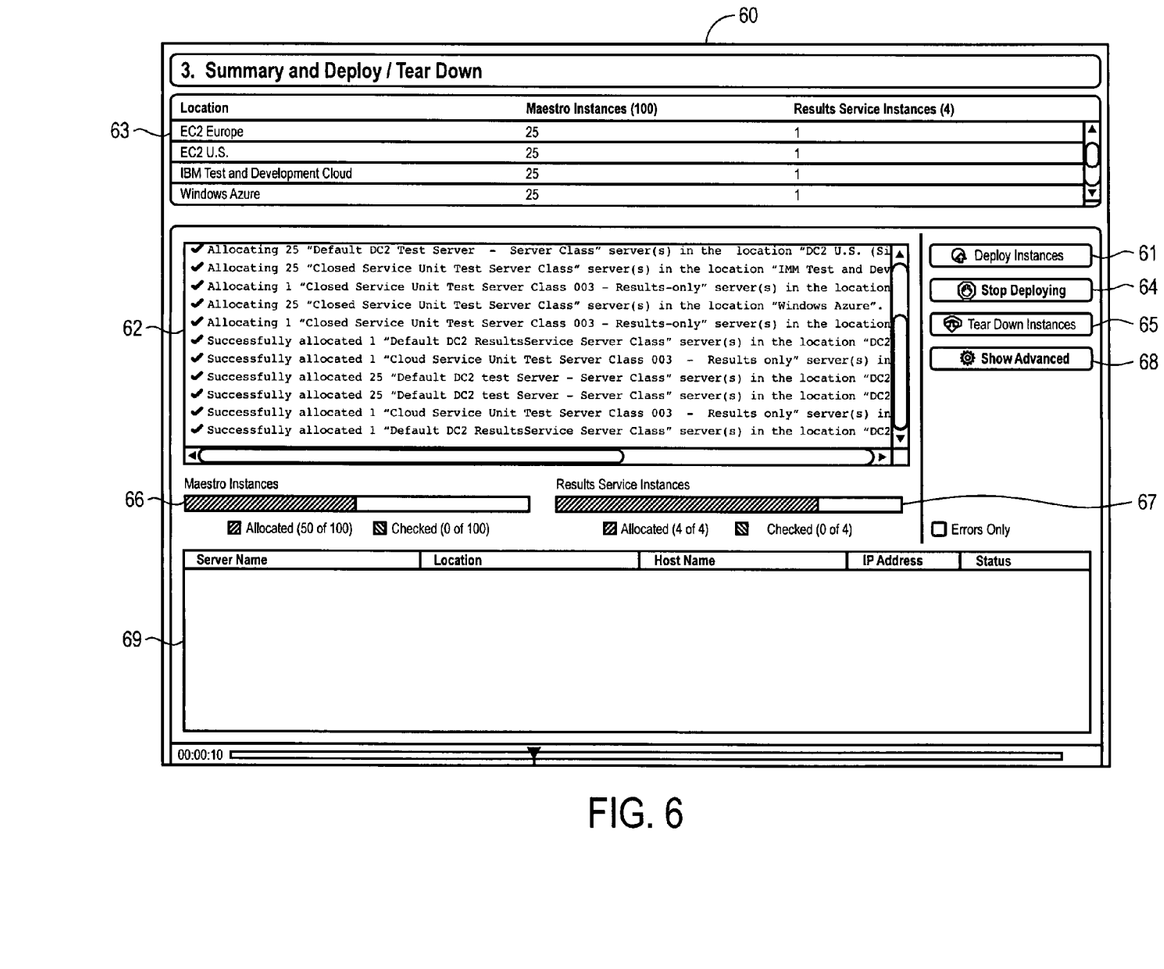
FIG. 6 illustrates an example user interface window showing the allocation of servers for an example grid in real-time to the user.

FIG. 6 illustrates an example user interface window 60 showing a summary of the allocation of servers for an example grid in real-time to the user. In this example, the user has already clicked on the "Deploy Instances" button 61 to initiate the deployment/allocation process. Allocation window or field 62 provides a text listing of the allocation operations of each instance deployed in the grid as it happens in real-time. Location field 63 provides a breakdown of the load server (Maestro) and result server (Results Services) instances for each of the various cloud providers. Check server field 69 is used to validate that all machine instances previously allocated for the grid a working properly and ready to the test composition.

In the embodiment shown, progress bar 66 shows the percentage allocation of load server instances in real-time to the user during the allocation process. Similarly, progress bar 67 shows the percentage allocation of result server instances in real-time to the user. If there are any errors during allocation the grid wizard program operates to retry to obtain these failed instances. The number of retires is a parameter that may be specified by the user in the grid wizard. Alternatively, a default retry number may be used. After successfully allocating the servers the CloudTest program automatically deploys load servers 21 and analytic servers 22 on the grid.

Any time during the process, a user may click on "Stop Deploying" button 64 to temporarily halt the deployment of server instances that make up the grid. Clicking on "Tear Down Instances" button 65 to 70 server instances previously allocated, thereby allowing the user to start the deployment/allocation process over from the beginning. Button 68 opens a new page or window of the user interface that provides the user with advanced setting options. For example, using the advanced settings button, and user may define the number of times the grid wizard will retry a server allocation that has failed.

Figure 7:
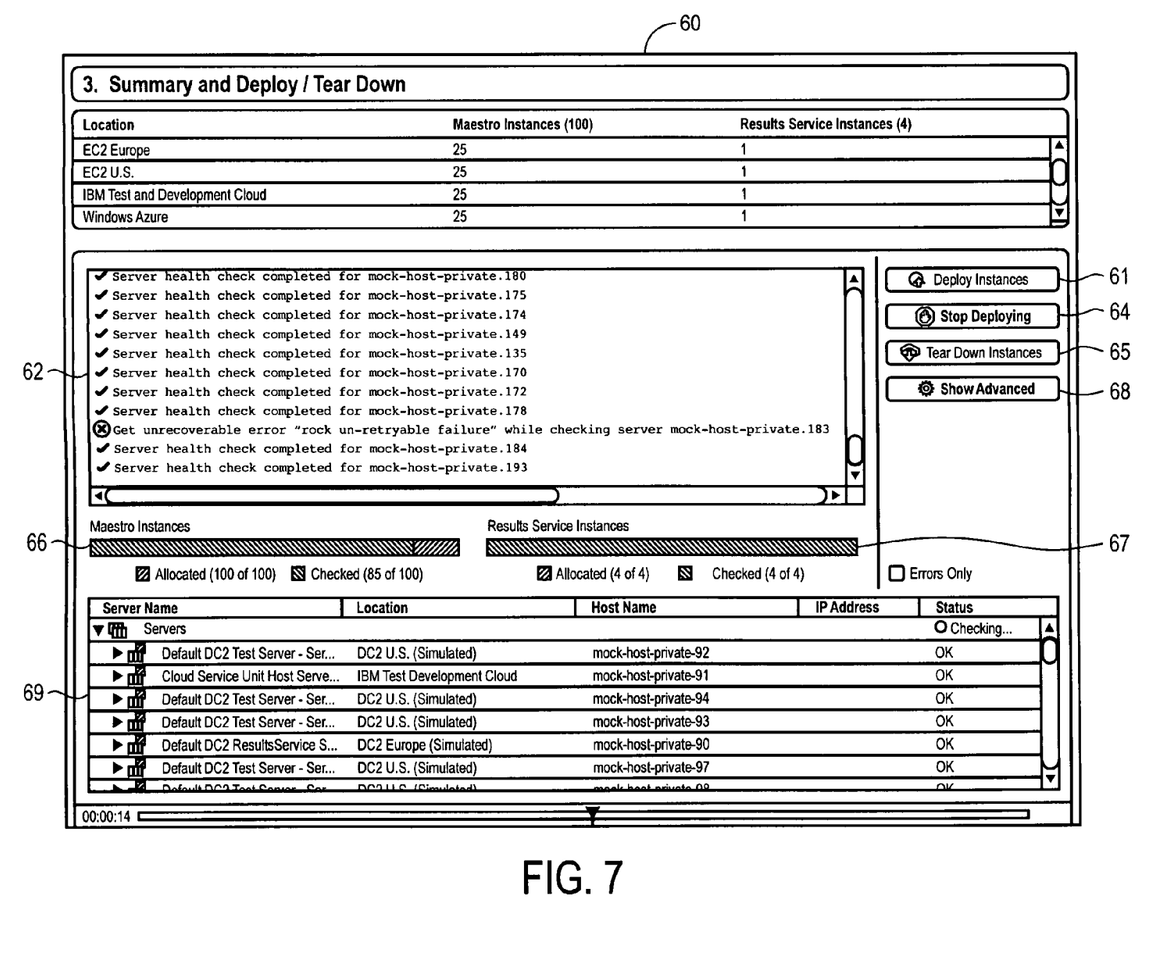
FIG. 7 illustrates an example user interface window showing the checking of servers for an example grid in real-time to the user.

FIG. 7 illustrates the example user interface window 60 of FIG. 6 after the allocation process has completed (100% of the server instances have been allocated). At this point out the process, each of the allocated servers are automatically validated or checked to be up and running, i.e., the cross-cloud grid is fully operational. In other words, the program checks each instance to make sure that it is operational, meaning that it has the right version number as the main instance that created it and passed a "health check", which may implemented differently for each service.

The program also operates to replace non-operational instances automatically, without user intervention. That is, in the event that any errors occur during allocation and checking of the service instances, the grid wizard automatically self-corrects the error to insure that the resulting cross-cloud grid is fully operational and ready to run the test composition on the target website. The user can monitor all this happening in real-time by viewing fields 62 and 69 of web browser page 60.

As can be seen, check server field 69 provides a text listing of the check status each instance deployed in the grid as it happens in real-time. In one implementation, progress bar 66 and 67 of the grid wizard graphically show to the user in real-time the percentage of servers that have been successfully allocated and successfully checked using different respective colors. For example, once the grid is fully allocated the user may see that progress bar 66 and 67 are fully blue. After each of the instances has been checked, the user may see t that progress bar 66 and 67 are fully green.

Figure 8:
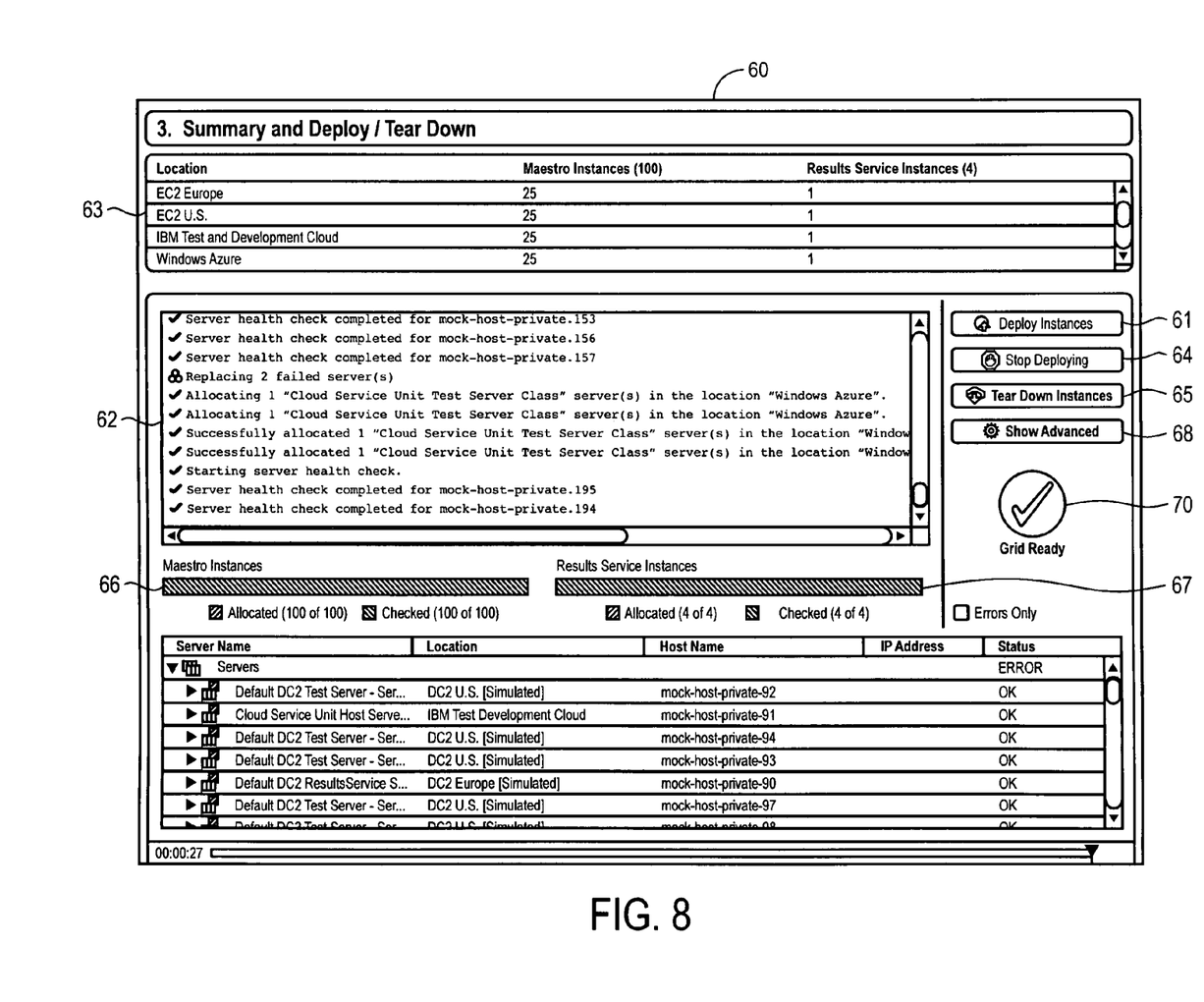
FIG. 8 illustrates an example user interface window showing that the allocation and checking of servers for an example grid is complete and the grid is ready to run a test composition.

FIG. 8 is an example of user interface window 60 after the allocation and checking of servers for an example grid is fully complete and the grid is ready to run a test composition. As shown, a large checkmark (e.g., green) icon 70 appears on the page, indicating that the grid can now be used to load and run the load test.

Practitioners in the art will appreciate that the CloudTest program described herein advantageously saves many hours of error prone manual allocation and error recovery to the user. Moreover, instead of dealing with different tools that each cloud provider provides to allocate the servers manually, then recover from the percentage of them which are non-operational, and from the ones that do not respond even after the product is deployed on them, the CloudTest program (grid wizard) automatically allocates, fixes errors and checks each server instance to make sure that the grid is ready for the user run the load test on the target website. After the grid is ready and the composition is running on it, users can focus on viewing, analyzing, and monitoring the test results/information in real-time so as to help identify the root cause of performance problems their website or web application may be experiencing.

One of the ways that the CloudTest program is able to allocate and check such a massive amount of resources in such a short amount of time as compared with prior art methods is through the use of a multi-threaded software architecture. In the context of the present disclosure, a "thread" refers to information associated with a single individual computing task, process, or a particular service request. The CloudTest computer program implements "multi-threading", meaning that it is configured to execute multiple threads—all in parallel—thereby allowing the program to execute many actions at one time.

In the multi-threaded architecture used to provision a cross-cloud grid, there may be a large number of threads populating a thread pool which concurrently issues requests for all blocks to cross-cloud providers at the same time. By way of example, to provision 1,250 servers, 25 requests (each request being for a block of 25 servers) may be sent in parallel to Amazon EC2; at the same time 25 similar requests may be sent in parallel to Microsoft Azure. Since each thread takes about the same amount of time to process, it becomes equally fast to provision 5 servers as it does to provision 1,250 servers. Furthermore, each response to every request is also handled in a multi-threaded manner. For instance, an error response may be received back indicative of insufficient capacity. That error is placed back in the thread pool as a new thread, e.g., a re-try allocation task.

Thus, the complex process of establishing a test grid—which involves allocating server resources for a particular test grid across multiple different cloud providers, verifying that the allocated servers are running correctly, and handling/responding to errors that inevitably occur—is all coded as a plurality of multiple threads. This means that the CloudTest program is capable of allocating a grid of 100 servers or a grid of 100,000 servers at the same time, as long as those server resources are available from the cloud providers it is working with.

Figure 3:
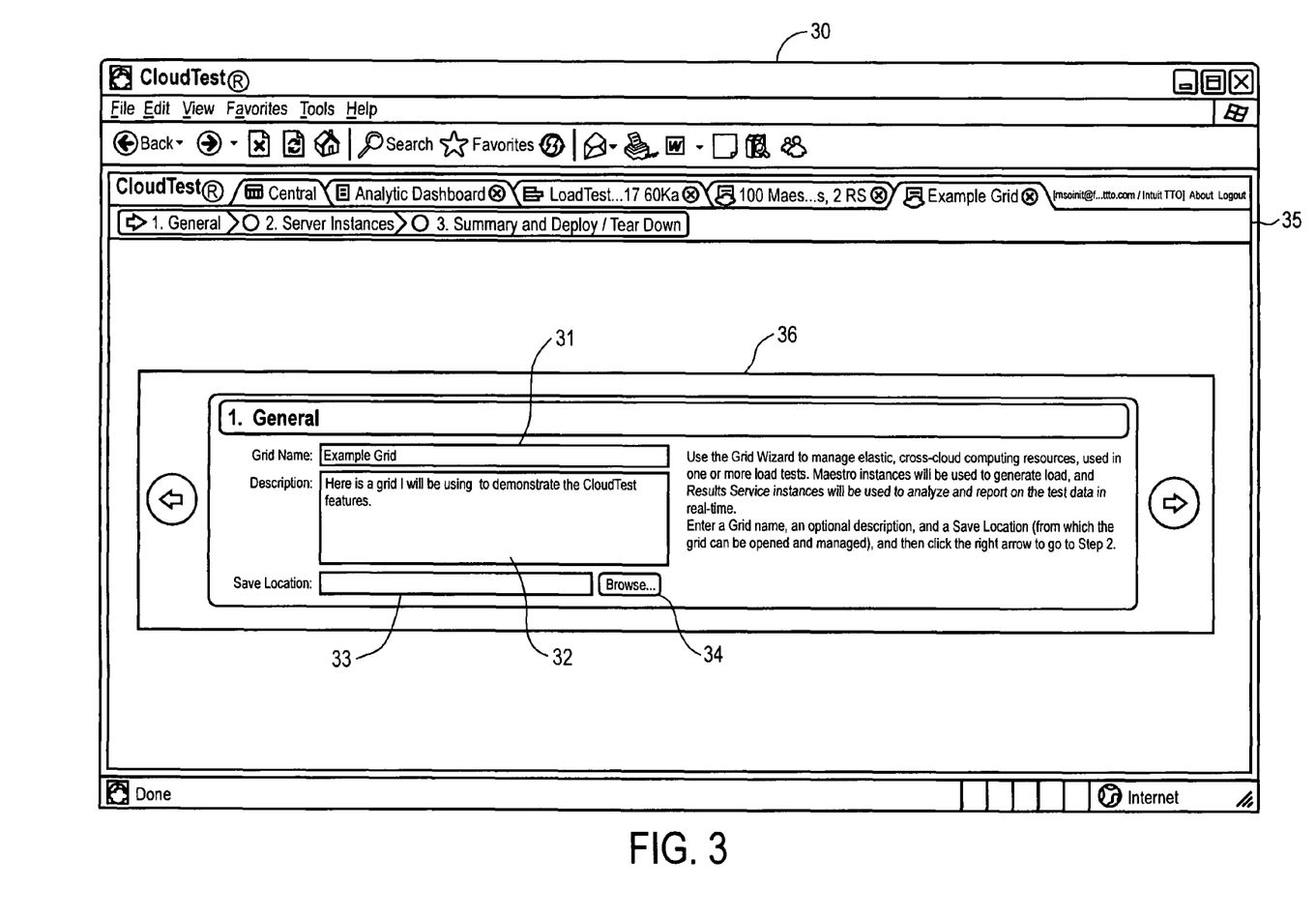
FIG. 3 illustrates an example web browser page with a user interface that allows a user to name and save a grid.

FIG. 3 illustrates an example web browser page 30 with a user interface that allows a user to name and save an example grid using a "General" user interface window 36. Window 36 may be opened by a user selecting the corresponding tab in tab field 35. Once opened, the user may give the grid a name, which is entered in a name entry field 31. This allows saving of all of the meta data of the grid so that the identical grid that was previously created can be used again to run the same test, or a different test. The meta data of the grid includes the number of load servers and results servers, and in which locations they are allocated. Storing this meta data thus allows the grid to be shut down when after running a test. Then, later on, if the user wants the same number of servers in the same locations/providers, he can simply open up the previously persisted grid definition and just click the "Deploy" button. In response, the CloudTest program automatically provisions/deploys the identical grid used for the previous test session.

Continuing with the example of FIG. 3, description field 31 optionally allows the user to enter a brief description of the grid. The user may also specify a location where the grid meta data and parameter settings for the named grid are to be stored using save location field 33 in conjunction with "Browse" button 34.

Figure 4:
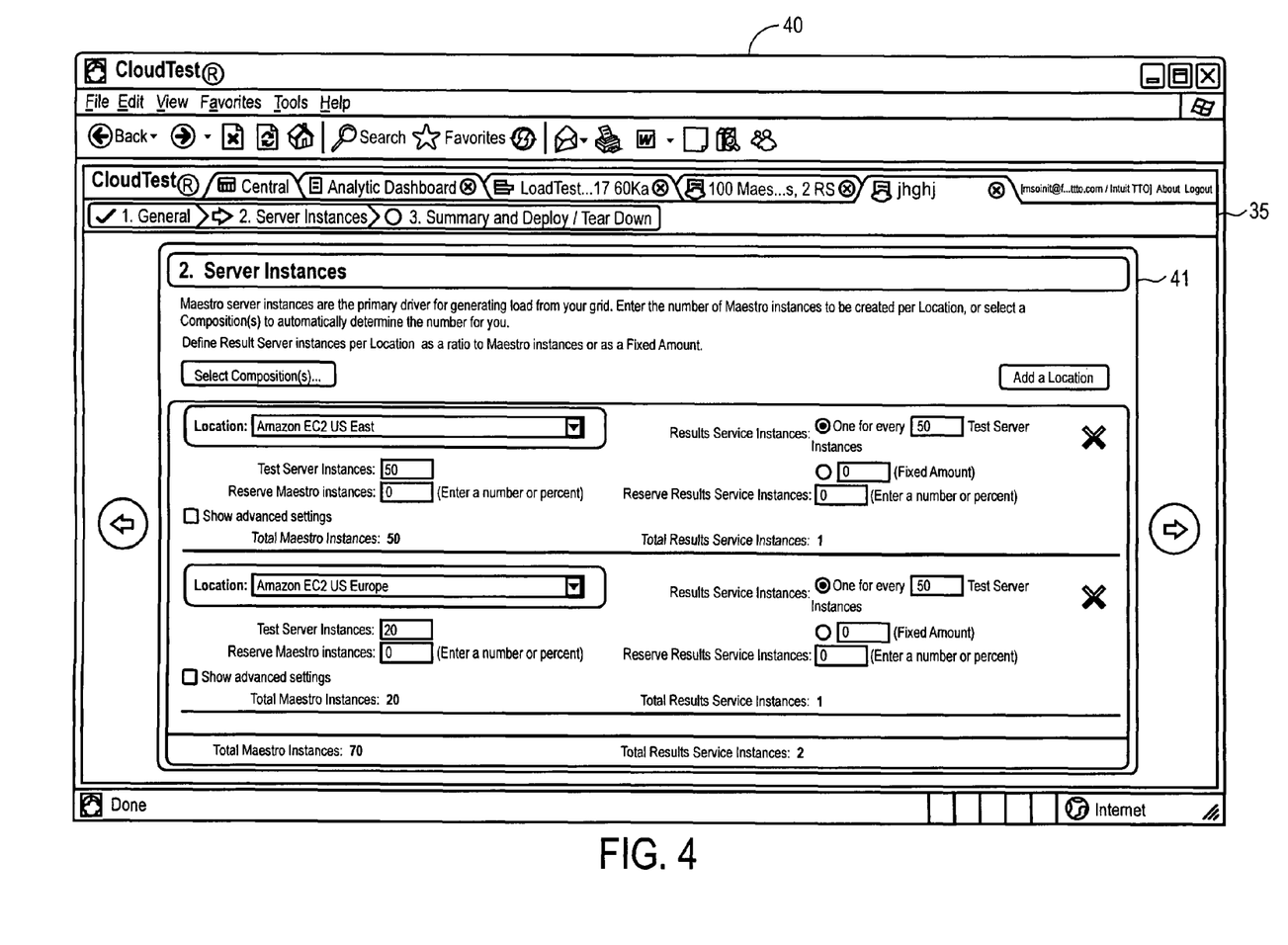
FIG. 4 illustrates an example web browser page with a user interface that allows a user to specify various parameters of the load servers and result servers for a grid.

FIG. 4 illustrates an example web browser page 40 with a user interface that allows a user to specify various parameters of the load servers and result servers for an example grid using a "Server Instances" user interface window 41. Window 41 may be opened via selection of the corresponding tab in tab field 35. Alternatively, the user may navigate forward to window 41 from window 36 by clicking on the right-hand side arrow button provided in window 36. The user interface shown in FIG. 4 allows the user to decide the number of virtual machines (i.e., server instances) and where they are to be obtained from. For example, the user may decide to obtain some servers (e.g., 50) from one geographic location (e.g., the eastern United States), and some from a different geographic location (e.g., Europe). That is, the user may require that the test composition run a certain number of virtual machines in the United States, and number of virtual machines in Europe. Alternatively, the user can simply provide the test composition, and from that definition the software can automatically determine all of the server metrics (e.g., using the grid wizard).

Figure 5:
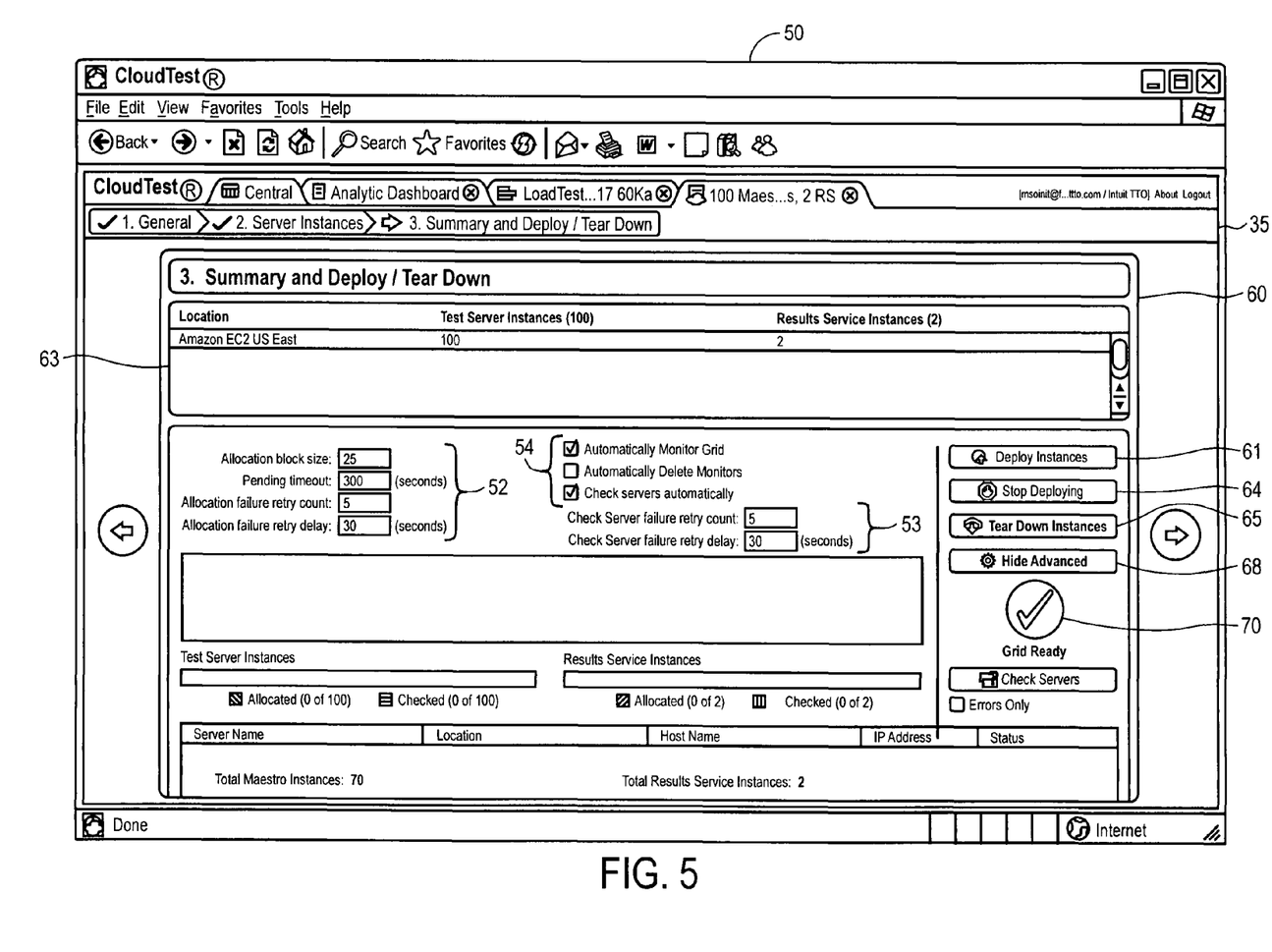
FIG. 5 illustrates an example web browser page with a user interface that allows a user to specify additional parameters associated with the allocation of servers for an example grid.

FIG. 5 illustrates an example web browser page 50 with a user interface that allows a user to specify additional parameters associated with the allocation of servers for an example grid using "Summary and Deploy/Tear Down" user interface window 60. In this example, the user has already clicked on button 68 to show a set of advanced user settings. (Note that clicking on button 68 causes the text description to toggle from "Show Advanced", as illustrated in FIG. 6, to "Hide Advanced". Another click on button 68 returns window 60 back to that shown in FIG. 6.)

As shown, window 60 of FIG. 5 includes a set of boxes 52 that permit the user to input parameters that include allocation block size (e.g., allocate 25 servers at a time), pending timeout (i.e., the time that a server remains in a pending state before the system considers it failed), allocation failure retry count (the number of times the system will try to boot one or more servers), and allocation failure retry delay (the time the system pauses before retry). Another a set of boxes 53 permit the user to input parameters a check server failure retry count and a check server failure retry delay. As discussed previously, after the cloud provider hands a machine off to the CloudTest program, a check is performed to ensure that the proprietary system software loaded on the cloud machine is running correctly. Check service boxes 53 thus allow input for retry counts and retry delay for the process of determining that each allocated server is executing the loaded software properly.

In addition, the user may check boxes 54 to automatically monitor the grid, automatically delete monitors, and check servers automatically during the running of the test composition. Once the grid has been fully provisioned and checked to make sure that it is running properly, the user may open a test composition user interface page to start the actual load test.

It is appreciated that the optional settings described above in conjunction with FIG. 5 are normally utilized by highly sophisticated users of the CloudTest provisioning tool. Less sophisticated users typically rely upon default settings implemented or selected automatically by the grid wizard.

Figure 11:
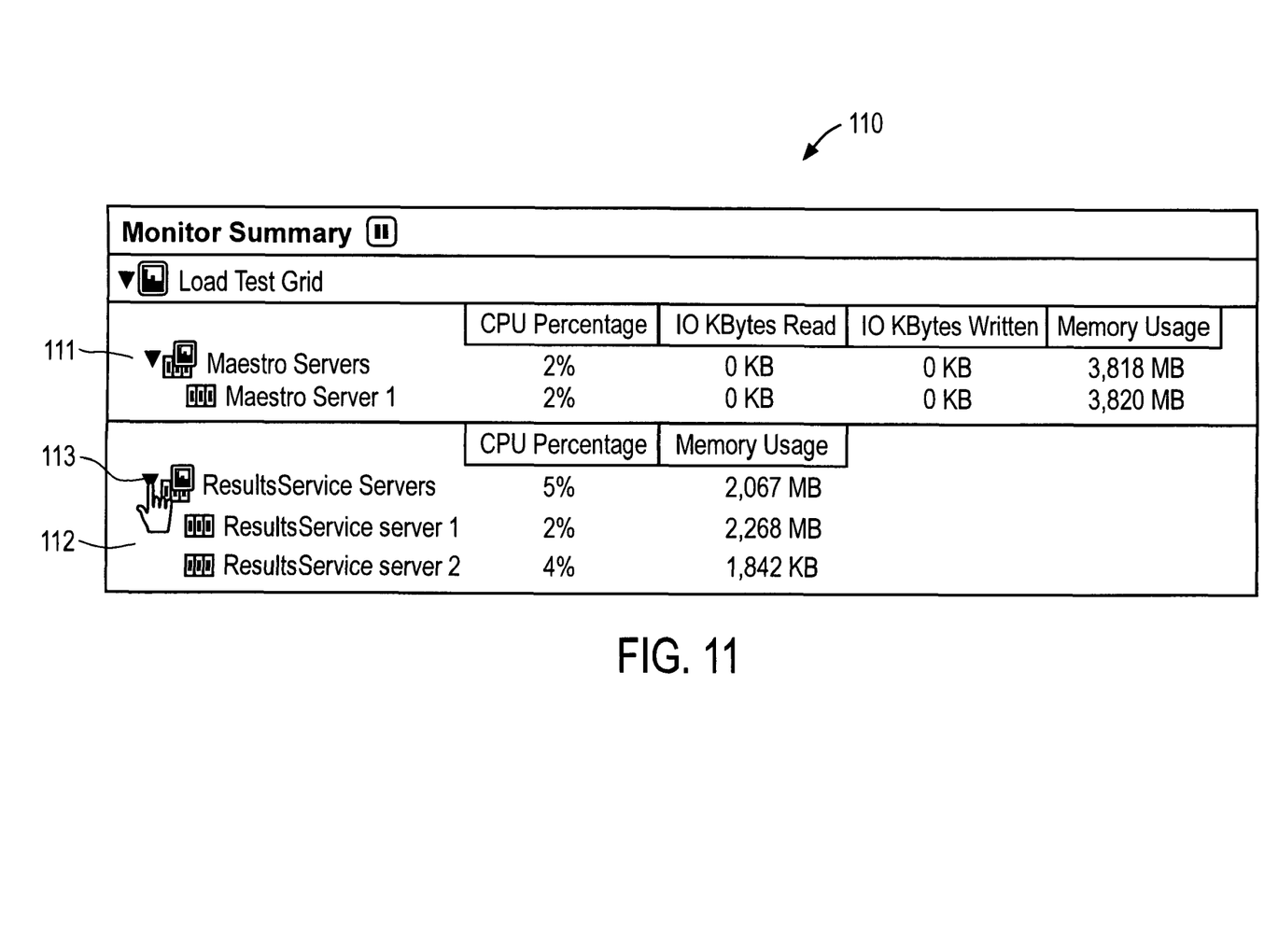
FIG. 11 is an example illustration of a monitor summary widget that allows a user to visibly monitor all of the server instances during execution of a test plan.

FIG. 11 is an example illustration of a monitor summary user interface window (also referred to as "widget") 110 that allows a user to visibly monitor all of the server instances during execution of a test plan. In other words, monitor summary widget 110 provides the user with visibility into the load that the test is creating on the grid server instances. In this manner, the user can ensure that all of the load servers and result (analytic) servers remain operational throughout the duration of the test. As shown, monitor summary widget 110 includes respective sections 111 and 112 for displaying performance metrics associated with the load servers and results servers that comprise the grid used in a particular test. In this example, the name "Maestro Servers" refers to all of the load servers, and the name "ResultsService Servers" refers to all of the result servers. In this particular implementation, the user can collapse each section (e.g., by clicking on the inverted triangle icon 113) in order to just look at the average metrics across all of the combined load and result servers.

Figure 9:
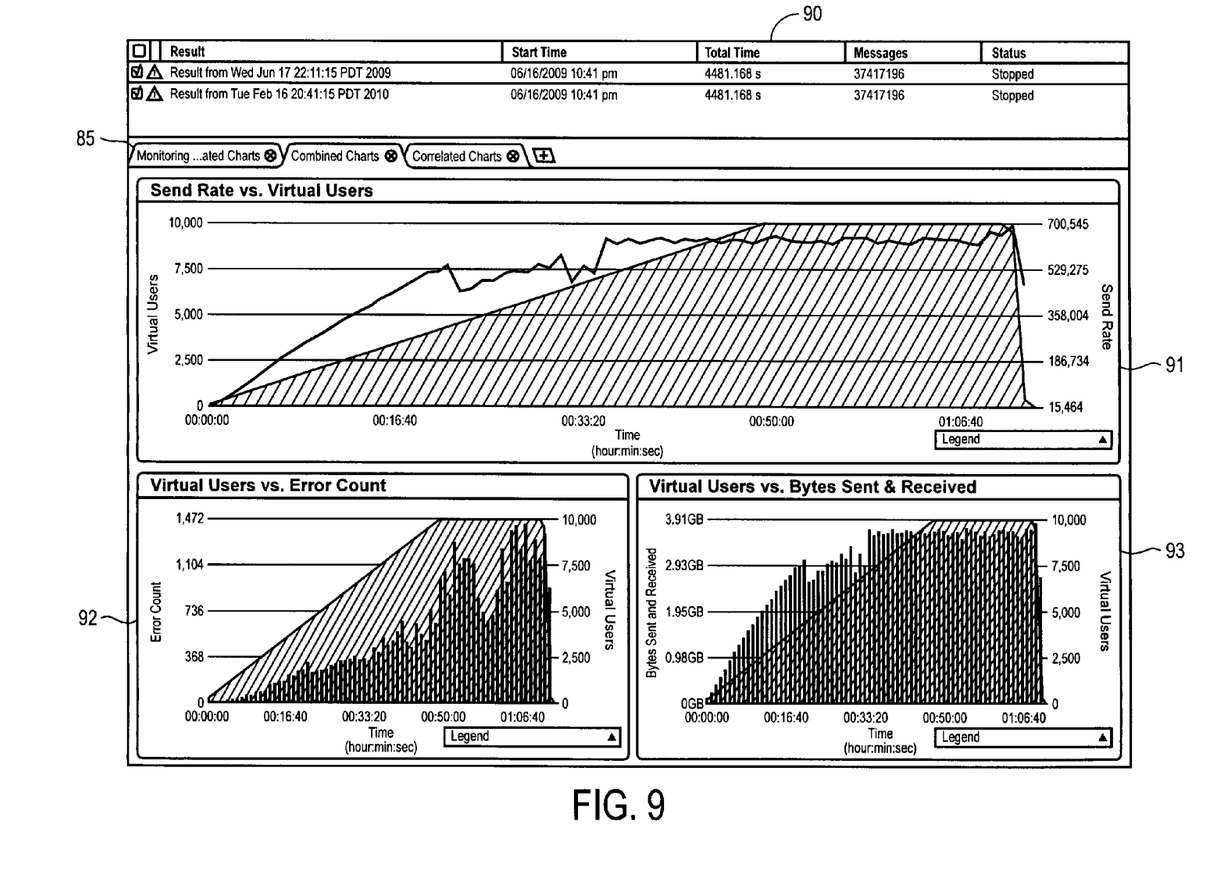
FIG. 9 illustrates an example graphical user interface window that shows real-time results of a test composition running on an example grid.

FIG. 9 illustrates an example graphical user interface window 90 that shows real-time results of a test composition running on an example grid. As can be seen, a set of combined charts are shown graphically in various window fields. For example, field 91 illustrates the number of virtual users (shaded area) and the send rate (heavy line) as a function of test time. Field 92 illustrates error count (vertical dark lines) and the number of virtual users (shaded area) versus test time. Field 93 shows the number of bytes sent and received (vertical dark lines) and the number of virtual users (shaded area) as a function of test time. It is appreciated that the user may select/view a wide variety of charts (combined, correlated, etc.) using tabs 95. Collectively, the charts provided in window 90 allow a user to view, analyze, and monitor test results and information in real-time so as to help identify root causes of performance problems their website or web application may be experiencing.

Persons of skill in the arts will appreciate that FIG. 9 shows how the entire test grid (comprising a huge number of interconnected load and result servers) works in concert to send load, receive responses, aggregate and analyze those responses into a real-time streaming graphical result displayed to the user. All this is accomplished regardless of how many server instances and different cloud providers are utilized to run the load test. Moreover, the various result charts may be viewed in one or many real-time streaming dashboards.

During the playback of the test composition and while the user is monitoring/viewing the test results displayed on GUI window 90, the user may pause or stop the test. Stopping the test closes the result and unloads the running test composition from all of the load servers. On the other hand, pausing or temporarily halting the test stops the load from all of the load servers, but keeps the test composition loaded and ready to resume playing into the same result. For instance, the user may pause the test after identifying a problem that requires adjustment of the load balancer on the target website. It should be understood that when the test is temporarily halted in this manner, the grid remains fully provisioned and running. In other words, the composition and running of the load test is independent from the provisioning and running of the grid. After any adjustments or reconfiguration of the target website, the user may continue with the execution or playback of the test composition, either beginning at the place where it was halted, or re-starting the test from the beginning. Persons of skill in the art will appreciate that the ability to start/re-start the test without affecting the state of the grid, in conjunction with the ability to view test results metrics in real-time (e.g., second-by-second) provides a powerful advantage over prior art methods for testing a customer website.

Figure 10:
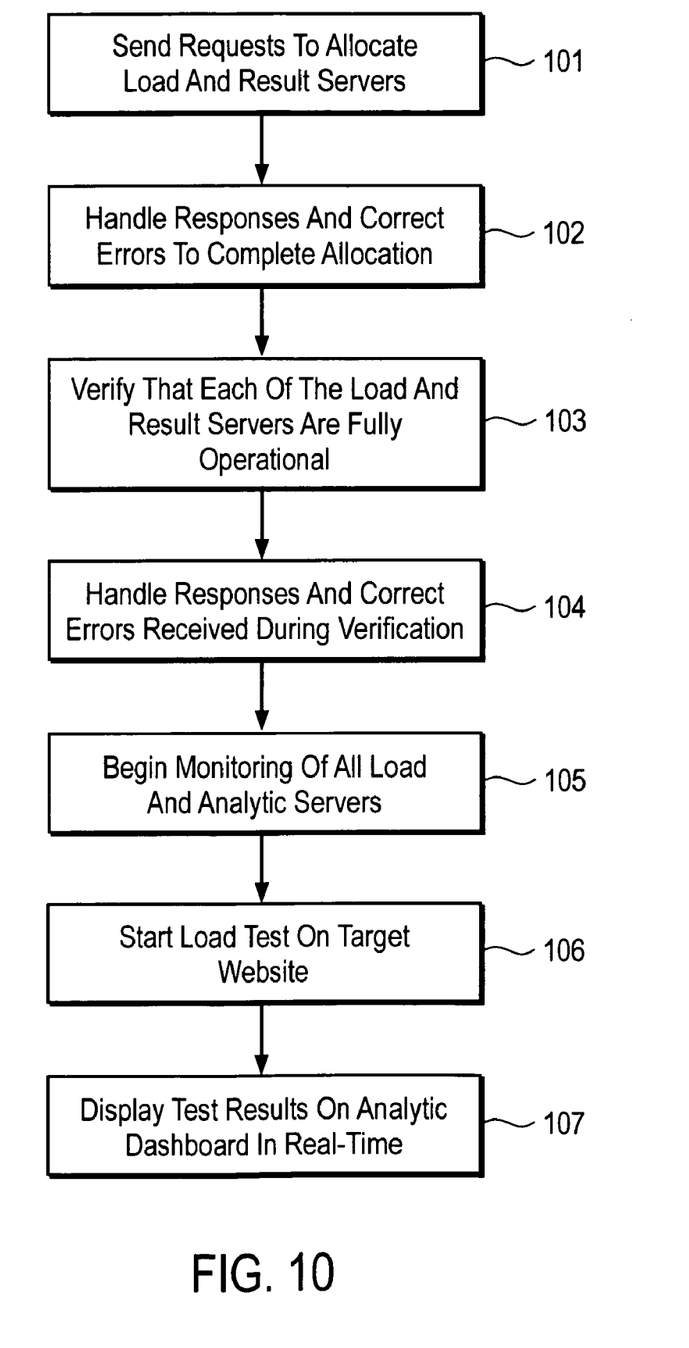
FIG. 10 is an example flow diagram of an automated sequence of steps for provisioning a test grid.

FIG. 10 is an example flow diagram of an automated sequence of steps for provisioning a test grid. The example method begins at block 101 with the sending of a plurality of requests to each of the cloud providers for allocation of the load servers and result servers needed for the grid defined for a particular test composition. The resources of the grid (e.g., the number of load and result servers, the location of the servers, etc.) and other parameters associated with the allocation (e.g., allocation block size, number of retries, etc.) may be defined by the user of the automated program, or determined by a grid wizard based on an examination of the test plan or script for testing the target website or website application. The sending of the requests may be carried out in a multi-threaded manner as described previously. Additionally, the sending of the requests to allocate the grid resources may be conducted in using a variety of different algorithms for server resource allocation (e.g., zone by zone, specified zone, round-robin across zones, etc.)

The automated program may also handle the responses received back from the cloud providers to each of the requests sent in a multi-threaded manner. Errors are automatically corrected during the allocation process. For example, non-operational servers may be replaced by sending out a new request. Requests that are not responded to within a prescribed time period may be re-tried or abandoned. That is, the program automatically obtains a new machine instance to replace any failed instances. In this manner, errors that occur during the allocation of server resources are automatically corrected until the allocation is complete (block 102).

Prior to executing the actual load test defined in the test composition, each of the resources which make up the grid are checked and verified to be fully operational (block 103). After successfully allocation all of the servers needed for the grid, the program automatically deploys the software utilized to provide the appropriate test services on each of the allocated instances. The verification step ensures that this software is running correctly on each of the load and result servers. In the event that any instance fails the verification or check step, the automated program may attempt to restart the failed instance or allocate a different instance (depending on the error). That is, the CloudTest program automatically handles responses and corrects any errors received during the verification step (block 104).

With all of the server instances of the grid up and running, the user may optionally begin monitoring of the operational status of all load and analytic (result) servers (block 105). Doing so, provides the user with visibility into the actual load that the test composition is creating on each of those instances. Monitoring the servers which comprise the grid ensures that each remains operational throughout the duration of the test. Any servers that are no longer operational can be promptly replaced.

Once the grid has been fully allocated and checked/verified to be up and running correctly, the user may start the load test on the target website or website application (block 106). As the test runs, the program may provide an analytic dashboard to allow the user to view and analyze the test results in real-time (block 107). In other words, the automated program allows the user to see cross-cloud consolidated results streaming in real-time. Just as a dashboard in a car identifies and provides feedback regarding the status of a car, an analytic dashboard is a graphical display that provides a user with insights from a large volume of data collected over time. The analytic dashboard provides analytic results (metrics) that help a customer to better understand the performance of their website or website application. The customer can thus visually see what is happening on their website in real-time during the test and identify what changes might be made to improve performance.

It should be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. An automated method for provisioning a grid used to run a bad test on a target website, comprising:
   sending one or more requests in a multi-threaded manner to a plurality of cloud providers, the one or more requests for an allocation of N load server instances and M result server instances, where N and M are positive integers, which comprise the grid;
   handling responses to the one or more requests received from the cloud providers in the multi-threaded manner, the handling of the responses including correcting errors in the allocation;
   verifying that each of the N load server instances and the M result server instances are operational and correctly running software deployed to provide defined test services; and
   correcting errors identified during the verifying either by attempting to restart failed instance or allocating a different instance.

2. The automated method of claim 1 further comprising determining the positive integers N and M based on an examination of the load test aimed at the target website.

3. The automated method of claim 1 wherein the allocation is performed utilizing multiple availability zones.

4. The automated method of claim 3 wherein the correcting of the errors is performed by changing at least one of the multiple availability zones.

5. The automated method of claim 1 further comprising deploying a main instance on a server in a cloud, the main instance including a browser application which provides a graphical user interface that allows a user to input parameters for provisioning of the grid.

6. The automated method of claim 5 further comprising storing the parameters in a database instance coupled to the main instance.

7. The automated method of claim 5 wherein the main instance includes an embedded bad server for running a minimal load test, and an embedded results server for collecting/aggregating real-time test results.

8. The automated method of claim 1 further comprising:
   executing the load test;
   outputting test results of the bad test in real-time on an analytic dashboard.

9. The automated method of claim 8 wherein analytic dashboard includes a display of cross-cloud consolidated results streaming in real-time.

10. The automated method of claim 1 further comprising monitoring an operational status of the N bad server instances and M result server instances of the grid.

11. A non-transitory machine-readable storage medium encoded with a computer program product for provisioning a grid used to run a load test on a target website, when executed the computer program product being operable to:
   send one or more requests in a multi-threaded manner to at least one cloud provider, the one or more requests for an allocation of N load server instances and M result server instances, where N and M are positive integers, which comprise the grid;
   handle responses to the one or more requests received from the at least one cloud provider in the multi-threaded manner;
   verify that each of the N bad server instances and the M result server instances are operational and correctly running software deployed to provide defined test services; and
   correct errors that occur in the grid either by attempting to restart a failed instance or allocating a different instance.

12. The non-transitory machine-readable storage medium of claim 11 wherein the computer-readable memory is further operable to determine the positive integers N and M based on an examination of the load test aimed at the target website.

13. The non-transitory machine-readable storage medium of claim 11 wherein the computer program product, when executed, is further operable to deploy a main instance on a server in a cloud, the main instance including a browser application which provides a graphical user interface that allows a user to input parameters for provisioning of the grid.

14. The non-transitory machine-readable storage medium of claim 13 wherein the computer program product, when executed, is further operable to store the parameters in a database instance coupled to the main instance.

15. The non-transitory machine-readable storage medium of claim 11 wherein the allocation is performed utilizing multiple availability zones.

16. The non-transitory machine-readable storage medium of claim 15 wherein error correction is performed by changing at least one of the multiple availability zones.

17. The non-transitory machine-readable storage medium of claim 11 wherein the computer program product, when executed, is further operable to:
   execute the load test;
   output test results of the load test in real-time on an analytic dashboard.

18. The non-transitory machine-readable storage medium of claim 17 wherein the analytic dashboard includes a display of cross-cloud consolidated results streaming in real-time.

19. The non-transitory machine-readable storage medium of claim 11 wherein the computer program product, when executed, is further operable to monitor an operational status of the N load server instances and M result server instances of the grid.

20. A computer for connecting with multiple cloud providers via a packet-based network to allocate resources for a test grid utilized to conduct a load test on a target website, comprising:
   an interface to connect with the packet-based network;
   a program that runs on the computer to produce a graphical user interface on a display, the graphical user interface providing a user with a grid wizard configured to automatically determine an allocation of the resources needed in each cloud of the multiple cloud providers for the test grid based on an examination of a test composition, the resources including a first number of load servers and a second number of result servers in each cloud, responsive to input of the user the grid wizard generating an output that deploys the allocation of the resources via communications with an application programming interface (API) associated with each of the multiple cloud providers.

21. The computer of claim 20 wherein the graphical user interface further provides an option that allows the user to manually specify the first number of load servers and a second number of result servers in each cloud.

22. The computer of claim 20 wherein the graphical user interface is configured to allow the user to visually monitor results produced during execution of the load test.

23. The computer of claim 20 wherein the graphical user interface is further configured to allow the user to visually monitor the allocation of the first number of load servers and the second number of result servers in each cloud in real-time.

* * * * *